ated Mar. 10, 1970

3,499,765
METHOD OF IMPROVING THE FLAVOR OF BAKED GOODS AND GOODS MADE BY THE METHOD
Andrew T. Lendvay, Oakland, N.J.
(2916 Halstead Ave., Richmond, Va. 23235)
No Drawing. Filed Nov. 9, 1966, Ser. No. 592,991
Int. Cl. A21d 15/00; A23l 1/22
U.S. Cl. 99—91                          9 Claims

ABSTRACT OF THE DISCLOSURE

When a nutrient composition consisting of a fermented mixture of yeast autolyzate and a carbohydrate and including enough additional carbohydrate to suppress further fermentation is added to dough prior to baking, the resulting baked goods have the characteristic flavor of yeast-leavened baked goods even if prepared without yeast fermentation. Maltol added to the mixture during formation thereof further enhances the flavor of the baked goods.

---

The present invention relates to a method of improving baked goods, particularly bread, by incorporating therein during production thereof, and preferably prior to the actual baking, a flavoring composition.

It is an object of the present invention to improve the flavor and taste characteristics of baked goods, particularly bread, in a simple and economical manner.

Other objects and advantages of the present invention will become apparent from a further reading of the description and of the appended claims.

In my U.S. Patent No. 3,051,576, a novel, pleasant tasting nutritional composition and a method of making the same is described, which is produced by subjecting a mixture of yeast and carbohydrates to partial fermentation. Thereafter the yeast is autolyzed by introduction of an amount of carbohydrates sufficient to arrest fermentation while maintaining a suitable autolyzation temperature.

Surprisingly, it has been found that the nutritional composition disclosed in my above-mentioned U.S. patent, when admixed to baked goods such as bread, cakes or the like, during processing but prior to actual baking of the same, will actually improve the flavor and taste characteristics of the finished baked goods. The improvement is particularly significant if the baked goods are produced by the well known continuous dough process or from dry mixes or chemically leavened doughs.

Thus, with the above-mentioned and other objects in view, the present invention is concerned with a method of improving the flavor of baked goods, which method comprises incorporating into a dough adapted to be baked (the term dough also to include dry mixes) an effective amount of a fermented mixture comprising yeast and a fermentable carbohydrate, and of an additional quantity of carbohydrate sufficient to cause autolyzation of the yeast and to prevent further fermentation, and baking the thus formed mixture modified dough.

In other words, according to the presently discussed embodiment of the present invention, it is proposed to admix to the dough, dry baking mix or the like, prior to baking of the same, an effective amount of the product disclosed and claimed in my above-mentioned patent. The term "effective amount" is meant to denote the proportion of the flavoring composition corresponding to the nutritional composition of my above-mentioned patent (or of an improvement thereof which will be described further below) which is to be incorporated in the dough or the like, in order to achieve the desired change and improvement in the flavor and taste characteristics of the finished baked goods.

Such effective amount generally will range up to about 10% of the solid ingredients of the dough and most preferably will be between 0.5% and 3%, although even smaller fractions of 1% result in some cases in the desired improvement of the baked goods.

The yeast autolysate disclosed in my aforementioned U.S. patent may be introduced in the continuous bread-making process into the semi-liquid paste dough, or the autolysate may be dispersed in water, or in milk, or in the liquid shortening, prior to admixing of the solid ingredients to the liquid brew in order to obtain an even dispersion of the autolysate. It is also possible to add the autolysate or a dispersion thereof to a portion of the flour and to mix until a dry and lump-free mixture is obtained. The thus formed highly flavor enriched flour portion is then dispersed in the dough. Generally, the autolysate may be incorporated in the dough in any desired manner and it is well within the skill of the art to determine in any given case the most advantageous method of incorporating the autolysate.

It is possible to incorporate the autolysate in dry mixes of the type which is commercially available for baking bread, rolls, cakes and the like. These dry mixes generally contain chemical leavening agents or self-rising flours and usually lack the flavor of yeast leavened baked goods. By incorporating the autolysate in dry form, for instance mixed with a small amount of flour so as to obtain a dry mixture, a flavor very much like the natural flavor of yeast leavened baked goods will be found in the finished product.

The autolysate can be obtained in dry form either by mixing with flour or by spraydrying or encapsulating the autolysate by conventional methods known to those skilled in the art.

A bread mix including such autolysate may consist, for instance of a dry mixture of three cups flour including 1% of the above-mentioned yeast autolysate, three quarter ounces double acting baking powder, one tablespoon skim milk solids and one tablespoon sugar.

The dry baking mix described above may then be baked in more or less conventional manner, for instance by pre-heating the oven to 375° F., greasing a loaf pan 9" x 3" x 5", placing into a mixing bowl one cup of warm water, about 125° F., adding two tablespoons of soft shortening and mixing until the shortening dissolves. Thereafter the above-described dry mix is introduced in small portions and well mixed and blended until smooth. The thus formed dough is then turned on a board and kneaded for about two or three minutes until smooth. The dough is then placed into the greased pan and allowed to stand at a warm place for 10–15 minutes. Thereafter the pan is placed in the pre-heated oven and the dough baked for about 45–50 minutes.

Surprisingly, it has been found that the flavor and flavoring characteristics of the nutritional composition disclosed in my above-mentioned patent can be substantially improved by carrying out either the fermentation or the autolyzation, or the fermentation and the autolyzation, as described in my patent, in the presence of maltol or of derivatives thereof, which have substantially the same flavoring characteristics as maltol.

Such derivatives include ethyl-maltol and iso-maltol, and also other derivatives such as methyl-maltol, isopropyl or propyl maltol, amino maltol and the like.

The maltol or derivative thereof may be admixed either in substantially pure form or in the form of a product containing maltol or a suitable derivative or precursor thereof, or in the form of a product which, under the conditions prevailing during the fermentation or autolysation will free maltol or a suitable derivative thereof.

Thus, the maltol or derivative may be admixed in the form of ground bark of young larch trees or ground chicory, or it may be derived from roasted malt or the hydrolysis of streptomycin.

It is well known that maltol is formed upon heating of certain compounds, particularly carbohydrates. It is found in certain roasted products such as roasted chicory or malt, or in spun sugar etc. In view thereof, it is also possible in accordance with the present invention to incorporate the maltol in the form of a precursor thereof which at baking temperature will form maltol or a derivative thereof having similar flavoring characteristics.

If the maltol or derivative thereof is to be incorporated in the mixture which is to be subjected to fermentation, then such mixture preferably should contain between 80 and 98 parts by weight of yeast, between 2 and 20 parts of weight of fermentable sugars and between about 0.02 and 12 parts by weight of maltol or the like. Most preferably, the mixture will contain between 85 and 95 parts by weight of yeast, between 5 and 15 parts by weight of fermentable carbohydrates and between 0.2 and 2 parts by weight of maltol.

If the maltol or the like is to be incorporated together with the fermentation arresting amount of carbohydrates, then the fermentation arresting carbohydrates such as sugars which are admixed in an amount at least equal to the weight of the fermenting mixture should be applied together with an amount of maltol or the like which is equal to between 0.01 and 6% of the weight of the fermentation arresting sugar, and preferably in an amount of between about 0.2 and 2% of the weight thereof.

Generally it is preferred to incorporate the maltol or the like in the fermenting mixture. However, as described above, it is also possible to admix the maltol or the like with the carbohydrate such as sugar which serves for arresting fermentation and for autolyzation of the yeast.

Sometimes it is advantageous to incorporate part of the maltol or the like in the fermenting mixture and to introduce additional maltol or the like with the fermentation arresting sugar.

In the latter case, maltol or the like preferably will be incorporated in the fermenting mixture in an amount equal to between 0.02% and 12% of the weight thereof, and admixed with the fermentation arresting sugar in an amount equal to between 0.01% and 6% of the weight of the arresting sugar of the final mixture.

The following examples will be given as illustrative only and without limiting the invention to the specific details of the example.

EXAMPLE I

In a jacketed vessel 1 kg. of pressed yeast having a water content of about 23–25% is intimately mixed with a blend of 100 g. of powdered cane sugar and 4 g. of maltol so that a pulverulent homogeneous mixture of these two constituents is formed. Preferably, mixing is continued until the entire mixture has been liquefied. At room temperature liquefication takes place within a few minutes, for instance within 5 minutes.

As soon as a homogeneous liquid has been formed, a small portion thereof, for instance 100 cm.$^3$ are placed into a calibrated cylinder. The main portion of the mixture and the small portion in the calibrated cylinder are now allowed to ferment, at a temperature of about 25° C. If room temperature deviates from the desired fermentation temperature, the temperature of the liquefied mixture will be adjusted by indirect heat exchange, with a fluid in the jacket of the vessel.

Fermentation is allowed to proceed until the volume of the mixture in the graduated cylinder will have risen to 135 cm.$^3$. Of course, the mixture in the cylinder must be maintained at the same temperature as the main portion in the jacketed vessel.

Fermentation will have to proceed for between about 15 and 30 minutes until the volume of the mixture has increased by 35%.

As soon as the volume of the liquid in the cylinder has reached 135 cm.$^3$, the contents of the cylinder are poured back into the vessel containing the main portion of the mixture, and 1.5 kg. powdered cane sugar blended with 16 g. maltol are stirred into the liquid. The temperature of the thus formed homogeneous paste-like or heavy honey-like mixture is now quickly raised to 55° C. and the mixture is allowed to stand under occasional stirring for a period of 16 hours. It is found that after 16 hours autolyzation has progressed to the desired extent and that the product has the desired taste and odor. At this point, the temperature is quickly raised to 90° C. and the mixture is allowed to stand at about 90° C. for two hours.

The mixture is now ready for packing. Upon cooling, it will form a viscous, brown liquid which may be included in nutrient compositions such as dough for baking.

EXAMPLE II

In a jacketed vessel 1 kg. of pressed yeast having a water content of approximately 22–25% is intimately mixed with 75 g. of powdered dextrose blended with an amount of malt extract sufficient to reach a maltol content of 1–4 g. and so that a pulverulent homogeneous mixture of these two constituents is formed. Preferably, mixing is continued until the entire mixture has been liquefied. At room temperature liquification takes place within a few minutes, for instance within 5 minutes.

A small portion of the mixture is separated and used for measuring volume increase during fermentation, as more fully described in Example I. The main portion of the mixture and the small portion in the calibrated cylinder are now allowed to ferment, at a temperature of about 18° C. If room temperature deviates from the desired fermentation temperature, the temperature of the liquefied mixture will be adjusted by indirect heat exchange with a fluid in the jacket of the vessel.

Fermentation is allowed to proceed until the volume of the mixture in the graduated cylinder will have risen to 120 cm.$^3$. Of course, the mixture in the cylinder must be maintained at the same temperature as the main portion in the jacketed vessel.

The desired increase in volume is found to have been reached after 30 minutes of fermentation.

As soon as the volume of the liquid in the cylinder has reached 120 cm.$^3$, the contents of the cylinder are poured back into the vessel containing the main portion of the mixture and a mixture consisting of 1.70 kg. powdered cane sugar, 10 g. maltol and 200 g. potato starch are stirred into the liquid and the vessel containing the mixture is now hermetically closed. The temperature of the thus formed homogeneous paste-like or heavy honey-like mixture is now quickly raised to 60° C. and the mixture is allowed to stand under continuous stirring for a period of 10 hours. It is found that after 10 hours autolyzation has progressed to the desired extent and that the product has the desired taste and odor. At this point, the temperature is quickly raised to 90° C. and the mixture is allowed to stand at about 90° C. for two hours.

The mixture is now ready for packing. Upon cooling it will form a viscous, brown liquid of pleasing taste and odor which may be consumed as such or included in nutrient compositions containing additional ingredients, for instance honey.

Many variations of ingredients and treating conditions are within the scope of the present invention. As shown above, autolyzation may be carried out in an open or in a hermetically closed vessel, although a hermetically closed vessel is preferred.

EXAMPLE III

In a jacketed vessel, 85 lbs. of pressed yeast having a water content of between 22–25% are intimately mixed with a blend of 9 lbs. of powdered canesugar, 1 lb. of powdered glucose, 1 lb. skim milk powder, 1 lb. of partially hydrolyzed gluten and approximately 1 lb. of parmalt extract having a maltol content of between 0.1 to 0.5 oz. so that a temporarily pulverulent mixture is formed of these constituents.

Upon standing at room temperature liquefication takes place soon and is followed by fermentation. As soon as the fermenting mixture reaches about double its original volume, a blend of 65 lbs. of powdered cane sugar, 10 lbs. partially hydrolyzed milk solids, 1 lb. maltol, 15 lbs. lactose, 2 lbs. sodium chloride and 15 lbs. wheat flour is mixed into the liquid under stirring. The temperature of the thus formed homogeneous mixture is now raised to 55° C., the vessel is closed and the mixture is allowed to stand under occasional stirring for a period of 22 hours. At this point the temperature is raised to 95–100° C. under constant stirring and the mixture is kept at this temperature for two hours. The vessel should be kept closed until cooled down to room temperature. The mixture is now ready for addition to any dough, but if it is intended to use it as an additive to dry mixes, it could be spray dried or microencapsulated or just mixed with a dry powder, for example with starch, flour or the like.

The following examples describe preferred compositions of starting mixtures, i.e., mixtures which are to be subjected to fermentation, and of arresting mixtures, i.e., mixtures used for stopping fermentation and for autolyzation of the yest, which starting and arresting mixtures—in the combination described in the respective example—give very good results in accordance with the present invention.

EXAMPLE IV

Starting mixture

| | G. |
|---|---|
| Pressed yeast *Sacch. cerevisie* (about 22–23% H$_2$O) | 85 |
| Saccharose | 13 |
| Glucose | 2 |
| Ltrixinic acid/maltol | 6.25 |

Arresting mixture

| | G. |
|---|---|
| Wheat flour | 30 |
| Skim milk solids | 20 |
| Lactose | 15 |
| Saccharose | 60 |
| NaCl | 3 |

EXAMPLE V

Starting mixture

| | G. |
|---|---|
| *Sacch. cerevisie* | 85 |
| Saccharose | 10 |
| Glucose | 5 |
| Skim milk powder | 10 |
| Coumarin | 0.1 |

Arresting mixture

| | G. |
|---|---|
| Wheat flour | 30 |
| Lactose | 30 |
| Saccharose | 65 |
| Maltol | 6 |
| Hyfoama | 1 |

Hyfoama is the trade name of a foaming agent produced in Holland and consisting essentially of partially hydrolyzed milk solids.

EXAMPLE VI

Starting mixture

| | G. |
|---|---|
| *Torula utilis* | 90 |
| Xylose | 10 |
| Ethyl-maltol | 0.1 |
| Milk solids | 5 |
| Buttermilk solids | 5 |

Arresting mixture

| | G. |
|---|---|
| Rye flour | 30 |
| Arabinose | 5 |
| Gum Arabic | 5 |
| Saccharose | 60 |
| Extract from ground bark of larch tree containing between 0.3–0.5 g. maltol | 20 |

EXAMPLE VII

Starting mixture

| | G. |
|---|---|
| *Sacch. cerevisie* | 85 |
| Saccharose | 10 |
| Glucose | 5 |
| Wheat gliadin | 1 |
| Maltol in 5 cc. glycerol | 0.25 |

Arresting mixture

| | G. |
|---|---|
| Wheat flour | 20 |
| Potato flour | 10 |
| Partially hydrolyzed gluten (wheat) | 5 |
| Egg albumin | 1 |
| Bromelain (enzyme) | 0.5 |
| Maltol | 1 |
| Hyfoama | 1 |
| Lactose | 10 |
| Saccharose | 65 |
| NaCl | 2 |

EXAMPLE VIII

Starting mixture

| | G. |
|---|---|
| *Sacch. cerevisie* | 82 |
| Glucose | 3 |
| Cotton Candy containing about 0.15 g. maltol | 15 |
| Milk solids | 2.5 |
| Whole wheat flour | 2.5 |
| Papain | 0.3 |

Arresting mixture

| | G. |
|---|---|
| Wheat flour | 30 |
| Lactose | 35 |
| Sucrose | 60 |
| Salt | 3 |

EXAMPLE IX

Starting mixture

| | G. |
|---|---|
| *Sacch. cerevisie* | 84 |
| Glucose | 5 |
| Powder blend: | |
|     Saccharose | 11 |
|     Egg albumin | 1 |
| Roaster malt, having a maltol content of between about 0.05 and 0.1 g. | 12.5 |

Arresting mixture

| | G. |
|---|---|
| Wheat flour | 30 |
| Sorbitol | 10 |
| Maltol | 3 |
| Lactose | 20 |
| Saccharose | 60 |
| NaCl | 3 |

EXAMPLE X

Starting mixture

| | G. |
|---|---|
| *Sacch. cerevisie* | 86 |
| Glucose | 4 |
| Saccharose | 10 |
| Chicory, having a maltol content of between about 0.02 and 0.3 g. | 3 |
| Iso-maltol | 0.15 |

Arresting mixture

| | G. |
|---|---|
| Wheat flour | 35 |
| Wheat starch | 10 |
| Taka Diastase | 1 |
| Hyfoama | 1 |
| Lactose | 10 |
| Saccharose | 60 |
| Salt | 3 |

In the last as well as in some other examples enzymatic materials are included. It has been found that during enzymatic autolysis reactions between certain amino acids and monosaccharides result in a bread-like flavor. Such reactions appear also to occur during the autolyzation of yeast in the presence of dough, i.e., in the presence of amino acids, sugars and ethanol, resulting in the formation of a flavoring complex. According to certain preferred embodiments of the present invention, it is intended to form more enzymatically hydrolyzed byproducts, in the form of peptides and amino acids which can be entirely esterified with sugars and/or alcohols. Thereby a further enhancement of the flavor of the products produced according to the present invention is achieved.

EXAMPLE XI

Starting mixture

| | | |
|---|---|---|
| *Sacch. cereisie* | g | 85 |
| Fructose | g | 5 |
| Saccharose | g | 10 |
| Furfural in 3 cc. glycerol | cc | 0.1 |
| Ethyl-maltol | g | 0.05 |
| Zein | g | 2 |
| Fungal protease | g | 0.25 |

Arresting mixture

| | G. |
|---|---|
| Wheat flour | 30 |
| Lactose | 30 |
| Saccharose | 65 |
| Partially hydrolized gluten | 1 |
| Hyfoama | 1 |
| Salt | 2.5 |

EXAMPLE XII

Starting mixture

| | G. |
|---|---|
| *Sacch. cerevisie* | 84 |
| Fructose | 3 |
| Glucose | 1 |
| Saccharose | 12 |
| Barley flour | 5 |
| Maltol in 5 cc. glycerol | 0.2 |

Arresting mixture

| | G. |
|---|---|
| Wheat flour | 30 |
| Lactose | 37.5 |
| Saccharose | 60 |
| Salt | 3 |
| Maltol | 1.6 |
| Ethyl-maltol | 0.1 |
| Iso-maltol in 5 cc. propylen glycol | 0.1 |

EXAMPLE XIII

Starting mixture

| | G. |
|---|---|
| *Sacch. cerevisie* | 85 |
| Glucose | 3 |
| Fructose | 3 |
| Saccharose | 9 |
| Maltol in 3 ml. glycerol | 0.25 |
| Partially hydrolyzed casein | 5 |
| Wheat flour, second clear (high gluten content) | 5 |

Arresting mixture

| | G. |
|---|---|
| Potato flour | 20 |
| Wheat flour | 20 |
| Active dry malt | 10 |
| Active dried yeast | 1 |
| Saccharose | 65 |
| Na-glutamate | 0.1 |

EXAMPLE XIV

Starting mixture

| | | |
|---|---|---|
| *Sacch. cerevisie* | g | 85 |
| Glucose | g | 3 |
| Fructose | g | 3 |
| Saccharose | g | 9 |
| Pepsin | mg | 100 |

Arresting mixture

| | G. |
|---|---|
| Wheat flour | 30 |
| Saccharose | 60 |
| Roasted chicory | 10 |
| High maltose syrup solids | 20 |
| Egg albumin | 2 |
| Hyfoama | 1 |
| Milk solids | 10 |
| NaCl | 1 |

EXAMPLE XV

Starting mixture

| | | |
|---|---|---|
| *Torula utilis* | g | 88 |
| Xylose | g | 11 |
| Arabinose | g | 1 |
| Ficin | mg | 20 |

Arresting mixture

| | G. |
|---|---|
| Wheat flour | 20 |
| Saccharose | 80 |
| α-Amino-isocaproic acid (leucin) | 0.1 |
| α-Amino-sec. butyl-acetic acid (iso-leucin) | 0.1 |
| Glucose | 10 |
| Hyfoama | 1 |
| Milk solids | 10 |

Ficin is a proteolytic enzyme derived from rubber plants (ficus).

EXAMPLE XVI

Starting mixture

| | G. |
|---|---|
| *Sacch. cerevisie* | 80 |
| Glucose | 10 |
| Saccharose | 5 |
| Lactose | 1 |

Arresting mixture

| | G. |
|---|---|
| Wheat flour | 30 |
| Lactose | 37.5 |
| Saccharose | 57.5 |
| Nacl | 3 |
| Maltol in 10 ml. glycerol | 1.5 |

EXAMPLE XVII

Starting mixture

| | | |
|---|---|---|
| *Torula utilis* | g | 87 |
| Arabinose | g | 3 |
| Xylose | g | 10 |
| Pepsin | mg | 87 |

Arresting mixture

| | G. |
|---|---|
| Potato flour | 20 |
| Partially hydrolized gluten | 10 |
| Maltol | 1 |
| Lactose | 35 |
| Saccharose | 60 |
| Salt | 3 |

The flavoring composition of the present invention may be incorporated in dough or the like in conventional manner, for instance as has been described herein.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. A method of improving baked goods which comprises incorporating into a dough adapted to be baked an effective amount of a fermented mixture comprising yeast, a fermentable carbohydrate, a quantity of carbohydrate sufficient to cause autolyzation of said yeast and to prevent further fermentation, and an effective amount of up to 12% per weight of said mixture of a flavor enhancing substance selected from the group consisting of maltol and derivatives thereof having flavor enhancing characteristics substantially similar to those of maltol, said flavor enhancing substance having been introduced into said mixture prior to autolyzation of said yeast.

2. A method as defined in claim 1, wherein the quantity of said fermentable carbohydrate is equal to between about 5% and 15% of the weight of said yeast, and the quantity of said autolyzing carbohydrate is at least about equal to the weight of said fermented mixture.

3. A method as defined in claim 1, wherein said flavor enhancing substance is selected from the group consisting of maltol, ethyl-maltol and iso-maltol.

4. A method as defined in claim 1, wherein said substance is incorporated in the form of a precursor thereof adapted to free said substance during fermentation of said mixture, or in the form of an extract formed of such precursor.

5. Baked goods prepared by the method of claim 1, said effective amount of said fermented mixture being between 0.5% and 10% of the solid ingredients of said dough.

6. A method as defined in claim 1, wherein said flavor enhancing substance is introduced into said mixture prior to fermentation thereof.

7. A dry mix for the preparation of baked goods, comprising a major proportion of dough-forming ingredients and as a flavoring constituent an effective amount of a composition essentially consisting of a fermented mixture of yeast, a carbohydrate adapted to ferment with said yeast, a liquefying carbohydrate in a proportion which produces liquefaction but suppresses further fermentation of said fermented mixture and an effective amount of up to 12% of the weight of said mixture of a substance selected from the group consisting of maltol and of derivatives thereof having flavor enhancing characteristics substantially similar to those of maltol, said substance having been introduced into said mixture prior to or simultaneously with said liquefying carbohydrate.

8. A mix as defined in claim 7, wherein said substance is selected from the group consisting of maltol, ethyl-maltol and iso-maltol.

9. A mix as defined in claim 7, wherein said carbohydrate adapted to ferment with said yeast is originally present in a quantity by weight equal to between about 5 and 15% of the combined weight of said carbohydrate and said yeast, and said liquefying carbohydrate is originally present in a quantity at least about equal to the weight of said fermented mixture.

References Cited

UNITED STATES PATENTS

| | | | |
|---|---|---|---|
| 3,051,576 | 8/1962 | Lendvai | 99—97 |
| 3,394,013 | 7/1968 | Dirks et al. | 99—91 XR |

OTHER REFERENCES

Hodge, J. E., et al.: "Flavor of Bread and Pastry Upon Addition of Maltol, Isomaltol, and Galactosylisomaltol," Cereal Chemistry, vol. 38, pp. 221–228, May 1961.

LIONEL M. SHAPIRO, Primary Examiner

JAMES R. HOFFMAN, Assistant Examiner

U.S. Cl. X.R.

99—94, 140